(12) United States Patent
Gschwind

(10) Patent No.: US 10,576,805 B2
(45) Date of Patent: Mar. 3, 2020

(54) ELECTRICAL HEATING DEVICE

(71) Applicant: Eberspacher catem GmbH & Co. KG, Herxheim (DE)

(72) Inventor: Thomas Gschwind, Bad Durkheim (DE)

(73) Assignee: Eberspächer catem GmbH & Co. KG, Herxheim (DE)

( * ) Notice: Subject to any disclaimer, the term of this patent is extended or adjusted under 35 U.S.C. 154(b) by 311 days.

(21) Appl. No.: 15/649,817

(22) Filed: Jul. 14, 2017

(65) Prior Publication Data

US 2018/0015805 A1 Jan. 18, 2018

(30) Foreign Application Priority Data

Jul. 18, 2016 (EP) .................................... 16179979

(51) Int. Cl.
| | |
|---|---|
| H05B 3/20 | (2006.01) |
| H05B 3/78 | (2006.01) |
| B60H 1/00 | (2006.01) |
| F24H 9/18 | (2006.01) |
| F24H 3/04 | (2006.01) |
| B60H 1/14 | (2006.01) |
| B60H 1/22 | (2006.01) |

(52) U.S. Cl.
CPC .......... B60H 1/00271 (2013.01); B60H 1/14 (2013.01); B60H 1/2221 (2013.01); F24H 3/0429 (2013.01); F24H 3/0435 (2013.01); F24H 9/1872 (2013.01); B60H 2001/00307 (2013.01); B60H 2001/2278 (2013.01)

(58) Field of Classification Search
CPC ........ F28D 1/03–0391; H05B 3/20–32; H05B 3/78

See application file for complete search history.

(56) References Cited

U.S. PATENT DOCUMENTS

| | | | |
|---|---|---|---|
| 5,318,114 A * | 6/1994 | Sasaki | F28D 1/035 165/109.1 |
| 5,922,233 A | 7/1999 | Ohashi et al. | |
| 6,178,292 B1 | 1/2001 | Fukuoka et al. | |
| 2005/0121173 A1* | 6/2005 | Inagaki | F28D 1/0325 165/80.3 |
| 2005/0230377 A1 | 10/2005 | Bohlender et al. | |
| 2008/0099464 A1 | 5/2008 | Niederer et al. | |
| 2010/0140245 A1* | 6/2010 | Lim | H05B 3/24 219/202 |
| 2012/0087642 A1 | 4/2012 | Bohlender et al. | |

(Continued)

FOREIGN PATENT DOCUMENTS

| | | |
|---|---|---|
| EP | 0 026 457 A2 | 4/1981 |
| WO | 2007/049746 A1 | 5/2007 |

Primary Examiner — Michael A Laflame, Jr.
(74) Attorney, Agent, or Firm — Boyle Fredrickson S.C.

(57) ABSTRACT

An electrical heating device includes a fluid-tight casing comprising inlet and outlet openings for the fluid to be heated, and at least one heat-generating element disposed in the casing. The heat generating element includes at least one PTC element and conductor elements of different polarities received in a flat tube. Heat heat-emitting elements abut against opposite sides of the flat tube. In order to increase the power density, the heat-emitting elements abut against the flat tube subject to spring pretension.

17 Claims, 8 Drawing Sheets

(56) References Cited

U.S. PATENT DOCUMENTS

| | | | |
|---|---|---|---|
| 2012/0267355 A1* | 10/2012 | Trapp | H05B 3/265 |
| | | | 219/202 |
| 2013/0191985 A1 | 8/2013 | Qin et al. | |
| 2014/0037277 A1* | 2/2014 | Kominami | F24H 1/142 |
| | | | 392/482 |
| 2014/0217088 A1 | 8/2014 | Twiney et al. | |
| 2015/0117846 A1 | 4/2015 | Kohl et al. | |
| 2016/0069588 A1* | 3/2016 | Kominami | H05B 3/50 |
| | | | 236/35 |

* cited by examiner

ELECTRICAL HEATING DEVICE

BACKGROUND OF THE INVENTION

1. Field of the Invention

The present invention relates to an electrical heating device with a fluid-tight casing comprising inlet and outlet openings for the fluid to be heated and at least one heat-generating element being received in a flat tube and arranged in the casing, and with heat-emitting elements abutting against opposite sides of the flat tube.

2. Description of the Related Art

Such an electrical heating device is known from DE 10 2013 111 987 A.

SUMMARY OF THE INVENTION

The present invention is based on the problem of specifying an electrical heating device which is improved in terms of its performance.

For this purpose, the present invention proposes an electrical heating device with a fluid-tight casing comprising inlet and outlet openings for the fluid to be heated and at least one heat-generating element received in a flat tube and arranged in the casing. Heat-emitting elements abut against the flat tube while being subject to spring pretension. For this purpose, a spring element is commonly provided on the side of the heat-emitting element facing away from the flat tube and abuts the heat-emitting elements in a heat-conductive manner against the flat tube(s) like in a layered structure. Spring elements can be provided on either side of this layered structure. The spring elements commonly clamp the layered structure on its outer side.

The layered structure commonly consists of alternatingly provided heat-generating elements and heat-emitting elements abutting thereagainst. A heating block is thus created where a flow of fluid to be heated flows against it within the casing. The casing is fluid-tight, i.e. is adapted to receive a fluid therein and to hold it in a sealed manner. Only the inlet and outlet openings provide inlets and outlets, respectively, to the heat-generating and heat-emitting elements in the form of the heat-emitting element. In the heating device according to the invention, the heat-generating element preferably, but not necessarily, comprises at least one PTC element and conductor elements energizing the latter to different polarities. However, for example, a wound metal conductor or semiconductor can also be formed as the heat-generating element and be accommodated in the flat tube, preferably with the interposition of an insulating layer. In the case of a PTC element with conductor elements of different polarity, they usually abut against mutually opposing surfaces of the PTC element and are electrically contacted with the PTC element via this abutment. One surface of the flat tube can there form a conductor track, while the other conductor track is accommodated in the tube, for example, in the form of a contact plate and is supported in an insulating manner against the inner circumferential surface of the flat tube and is contacted with the PTC element in an electrically conductive manner. In such an embodiment, the flat tube itself is located on a polarity and is used as a current conduction path.

The electrical heating device is, in particular, an electrical heating device in a motor vehicle. The above-described specific embodiment is suitable for energizing an electrical heating device in a vehicle electrical system having a voltage of 12 V, since this voltage is uncritical, so that the voltage can also possibly be applied externally to the heat-generating or heat-emitting layers, respectively.

According to a preferred embodiment of the present invention, it is proposed with regard to higher-voltage applications to receive the conductor elements in the flat tube, in particular with the interposition of an electrical insulation which rests against the inner circumferential surface of the tube. The electrical insulation can completely line the inner circumferential surface of the flat tube. Alternatively, parallel insulating layers can also be applied to the main side surfaces of the flat tube in the inner circumference in order to support the conductor elements on the side of this insulation opposite to the flat tube. These conductor elements are commonly inserted into the flat tube as elongated contact plates. They commonly clamp the PTC element directly in between them. The respective contact in the flat tube can be enhanced by cold-shaping the flat tube after insertion of the conductor elements and the PTC element(s). Several PTC elements are commonly arranged one behind the other in the direction of longitudinal extension of the flat tube and are connected in parallel between the conductor elements.

The filling within the flat tube consisting of the conductor elements and the PTC element, possibly the insulating layer, can be accommodated in insulating manner and sealed inside the flat tube. For this purpose, the free space remaining in the flat tube can be filled with an electrically insulating potting compound in order to seal the flat tube on the outside and protect it against the ingress of the fluid.

According to a preferred embodiment of the present invention, a layering composed of several heat-generating and several heat-emitting elements is provided. Heat-generating elements are there commonly provided in alternation to heat-emitting elements. Several heat-emitting elements can be arranged between individual heat-generating elements. The heat-emitting elements can be corrugated rib elements which comprise meandering bent strips of sheet metal. Alternatively, the heat-emitting elements can also be extruded sections, in particular made of aluminum or copper. The heat-emitting elements commonly have heating ribs or corrugated ribs extending substantially transversely to the layering which space apart the individual heat-emitting layers and/or heat-generating layers of the layering. The corrugated ribs commonly directly abut the outer circumferential surface of the flat tube. In general, identical heat-emitting elements are provided between the heat-generating elements.

According to a preferred development of the present invention, this layering abuts between casing walls which on the inner side define an outlet and inlet passage, respectively, extending in the longitudinal direction of the flat tube. The respective casing walls commonly extend parallel to one another and are adapted for the abutment of the spring element, are in particular formed to be planar. On the side of the casing wall which is located opposite to the layering, the casing wall separates the inlet and outlet passages in the casing. It is to be understood that the inlet passage on one side of the layering in the casing opens toward the layering, whereas the other passage opens on the opposite side of the layering toward the latter in order to force a flow from the inlet to the outlet side through the layering. The layering can there be arranged slightly inclined so that a widening flow passage is provided between the casing walls and the layering towards the inlet and outlet passages, respectively. This promotes a uniform flow through the layering in the height direction and promotes a low-pressure loss when the fluid flows through the casing, while the fluid is simultaneously heated.

The casing can be made entirely or in part of metal or plastic material. In the case of embodiment as an electrical heating device in a motor vehicle, it is also important to design the casing as light-weight as possible. The casing can be made entirely or in part of aluminum and be designed as an extruded section.

According to a preferred development of the present invention, the inlet passage is substantially open over the entire length of the flat tube toward the layering that is composed of heat-emitting and heat-generating elements. The fluid delivered from the inlet passage is thereby distributed uniformly over the entire length of the flat tube in the direction of the layering. In a corresponding manner, the outlet passage is also substantially open over the entire length of the flat tube toward the layering in order to discharge the fluid that is heated in the layering from the electrical heating device on the fluid side, preferably without a large pressure loss. It is regularly assumed that the casing is made of a casing block which is closed at the end with closure caps. The length of the casing block preferably corresponds substantially to the length of the flat tube. All the flat tubes are commonly provided having identical lengths and being connected at least to one of the closure caps at the end side.

According to a preferred embodiment of the present invention, the closure caps sealingly close the face sides of the casing block. This casing block can be formed from aluminum and as an extruded section. The closure caps can be formed from metal or plastic material. In view of the necessary insulation of the conductor elements of different polarity, in particular the closure cap enabling the connection of the PTC element should also be made of plastic material on the connection side. The closure caps preferably abut against the casing block with the interposition of an elastic seal. Clamping screws can pass through the casing block longitudinally, i.e. parallel to the direction of longitudinal extension of the flat tube, and clamp the closure caps that are provided on opposite sides against the casing block. It goes without saying that the casing block should have a planar abutment surface on its opposite face sides at which the casing block is open. The closure caps can comprise a groove for receiving the seal. The casing block should preferably have only planar and easy-to-produce abutment surfaces. When configuring the closure caps as plastic injection-molded members and a casing block as an aluminum extrusion section, this results in a design which is easy and simple to produce.

According to a preferred embodiment of the present invention, it is also proposed that at least one of the closure caps is to comprise a connection port surrounding the inlet and the outlet opening, respectively. This closure cap commonly has two connection ports, one connection port for the inlet side and one for the outlet side.

The flat tube preferably abuts in a sealed manner against one of the closure caps, and a connection strip being electrically coupled to the conductor track is electrically insulated by this closure cap. For this purpose, the flat tube(s) can be connected to the closure cap by way of overmolding during the injection-molding process of the closure cap from plastic material and sealed therein, where the connection strip, preferably all the connection strips, are passed through the closure cap to the individual heat-generating elements and are exposed on the side of the closure cap opposite to the flat tube for the electrical connection.

According to a preferred development of the present invention, the layering is installed in an inclined manner, so that a flow cross-section between the layering and the casing decreases as the distance from the inlet or outlet passage increases. This flow cross-section extends at a right angle to the associated passage. The flow cross-section is commonly formed throughout and preferably having a uniform cross-section in the direction of longitudinal extension, i.e. in the axial direction of a casing block. It tapers transversely to this longitudinal extension, which substantially corresponds to the longitudinal extension of the respective passage.

According to a preferred embodiment of the present invention, the casing has a partition wall. This partition wall is preferably formed integrally with the casing block, which in this preferred embodiment is formed from metal, for example, aluminum or copper. The partition wall preferably defines the inlet passage at least in part, i.e. is provided on the cold side of the heating device. The partition wall separates a circulation chamber for the fluid to be heated from a control chamber for accommodating a control device. In the preferred embodiment presently discussed, this control device comprises at least one power switch creating power dissipation which is coupled to the partition wall in a heat-conducting manner. The power dissipation is also utilized to heat the fluid, whereby the power switch is at the same time efficiently cooled.

In particular, in an embodiment in which one of the closure caps comprises the connection ports to the inlet and outlet openings, the other of the closure caps is preferably provided with a printed circuit board, the conductor elements of which are connected in an electrically conductive manner to the conductor elements to several heat-generating elements. The printed circuit board can only comprise conductor elements for grouping the heat-generating elements. In this case, the printed circuit board is not equipped with components, but comprises only contact elements for contacting the individual connection strips to the heat-generating elements. In this case, a second printed circuit board with components is usually provided, the heat-generating power switches of which are in a heat-conductive manner usually coupled to the cold side of the heating device. Such a second printed circuit board can extend parallel to the layers of the layering, i.e. parallel to the flat tube.

The casing comprises a commonly integrally formed casing block which can regularly be an aluminum extrusion member, but in any case preferably has a cylindrical configuration. Its cross-sectional geometry commonly extends transversely to the longitudinal extension of the inlet and outlet passages. As already mentioned above, the casing block commonly comprises the abutment surfaces for the layering, which are also part of the cylindrical alignment and configuration of the casing block.

Preferably, the casing block further comprises a sliding guide for the printed circuit board, into which the printed circuit board can be inserted and in which the printed circuit board is held subject to pretension bearing against a partition wall formed by the casing block. The printed circuit board does not commonly bear directly against the partition wall. Instead, the printed circuit board is on the side facing the partition wall commonly equipped with one or more power transistors which are electrically insulated by interposition of an insulating layer, but bear against the partition wall with good thermal conductivity. The printed circuit board itself can be held in a tensioned manner, i.e. abut the power transistor against the partition wall by elastic deformation. At least one of the grooves forming the sliding guide can Just as well be formed thicker than the printed circuit board and can be provided with a compression element which pretensions the printed circuit board in the direction toward the partition wall. The printed circuit board can first be inserted into the sliding guide and is then slidable parallel to the longitudinal extension of the casing block, held in a direction at a right angle thereto, but substantially in a predetermined manner. By inserting a pretension element into at least one of the grooves, the printed circuit board is pressed against the partition wall, whereby the printed circuit board is fixed in a stationary manner relative to the partition wall.

BRIEF DESCRIPTION OF THE DRAWINGS

Further details and advantages of the present invention shall arise from the following description of an embodiment in combination with the drawing, in which.

DETAILED DESCRIPTION

Figure 1:
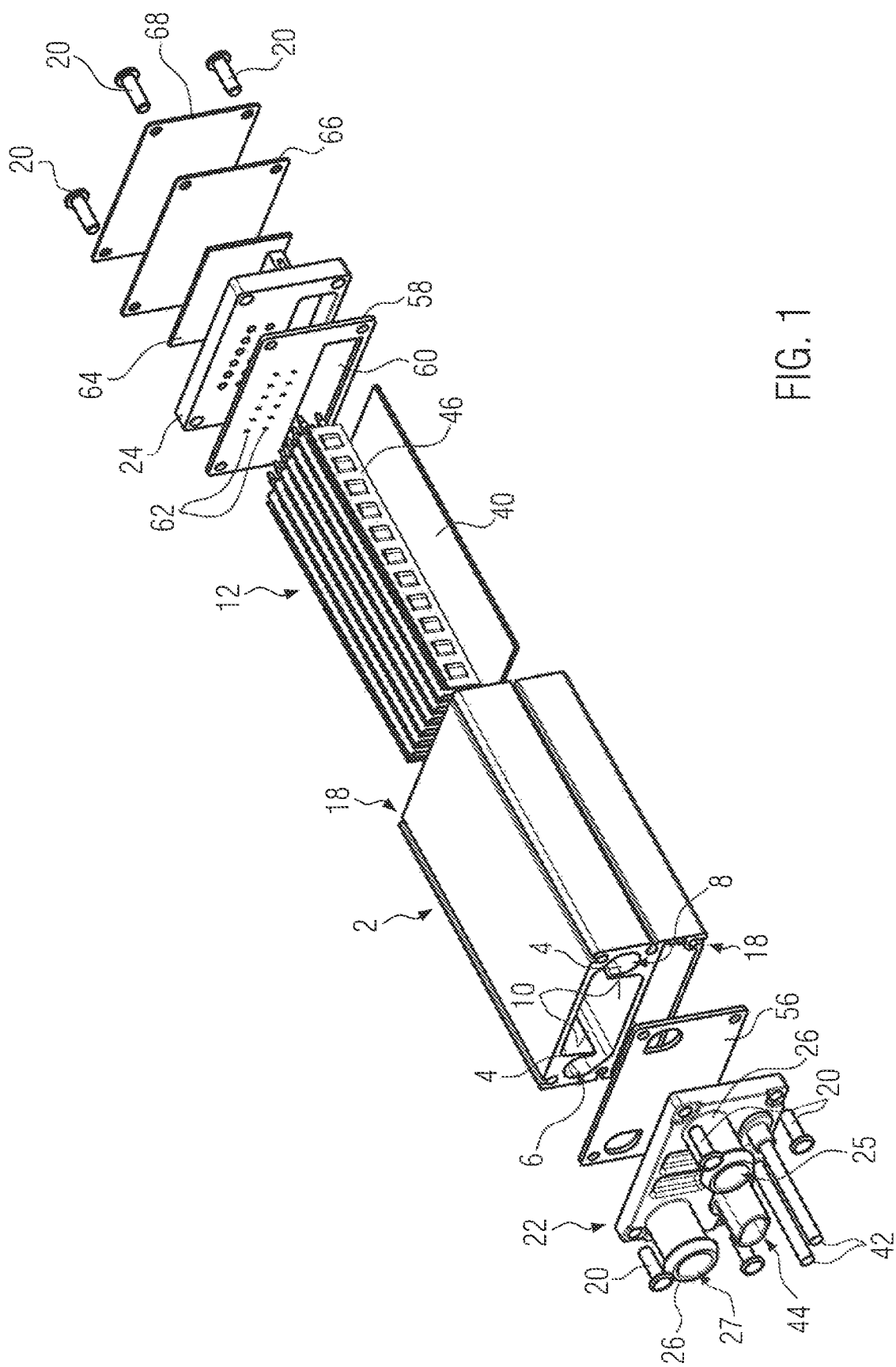
FIG. 1 shows a perspective side view as an exploded illustration of the embodiment.

Reference numeral 2 in the figures designates a casing block 2 designed as an aluminum extrusion section which is configured as one piece and integrally forms casing walls 4, which on the inner side define an inlet passage 6 and an outlet passage 8, respectively, and form flat abutment surface 10 extending in parallel to one another on the side opposite the passages 6, 8 and parallel to each other for a layering 12 composed of heat-emitting elements 14 and heat-generating elements 16. In the corner regions of the casing block 2, through-bores 18 are provided, recessed in and passing through the casing block 2, which, in the installed state, are penetrated by clamping screws which abut closure caps 22, 24, that are formed from plastic material, against the casing block 2 in a sealing manner. Of this, FIG. 1 shows only the fastening nut 20 for threaded bars—not illustrated—which are received in the through-bores 18 and extend over the length of the casing block 2. As illustrated in FIG. 1, the closure cap 22 drawn in there at the front has two connection ports 26 which are formed integrally as hose connection ports on the closure cap 22, surround inlet and outlet openings 25, 27, and are steplessly and directly flush with the inlet and outlet passages 6, 8, respectively.

The layering 12 is positioned inclined in the casing block 2 so that a flow cross-section 29 between the layering 12 and the casing block 2 decreases as the distance from the inlet or the outlet passage 6, 8 increases. This flow cross-section 29 is located in a cross-sectional plane through the casing block 2 and is at a right angle to the longitudinal extension of the inlet or outlet passage, respectively.

The structure of the layering 12 shall be explained in more detail below with reference to FIGS. 2 to 4. Each of the heat-emitting elements 14 is configured identically. They are meandering bent sheet metal strips which form corrugated ribs extending substantially at a right angle to the layers of the layering 12. The layers of corrugated ribs can have resilient properties by themselves, in order to abut the layering 12 subject to pre-tension against the abutment surface 10 of the casing walls 4 and to hold the individual elements 14, 16 of the layering 12 with pre-tension against one another. This ensures good heat transfer at the boundary surfaces between the individual elements 14, 16 of the layering 12. Furthermore, such a spring pre-tension allows for good electrical contact of the individual layers of the heat-generating elements 16.

Figure 2:
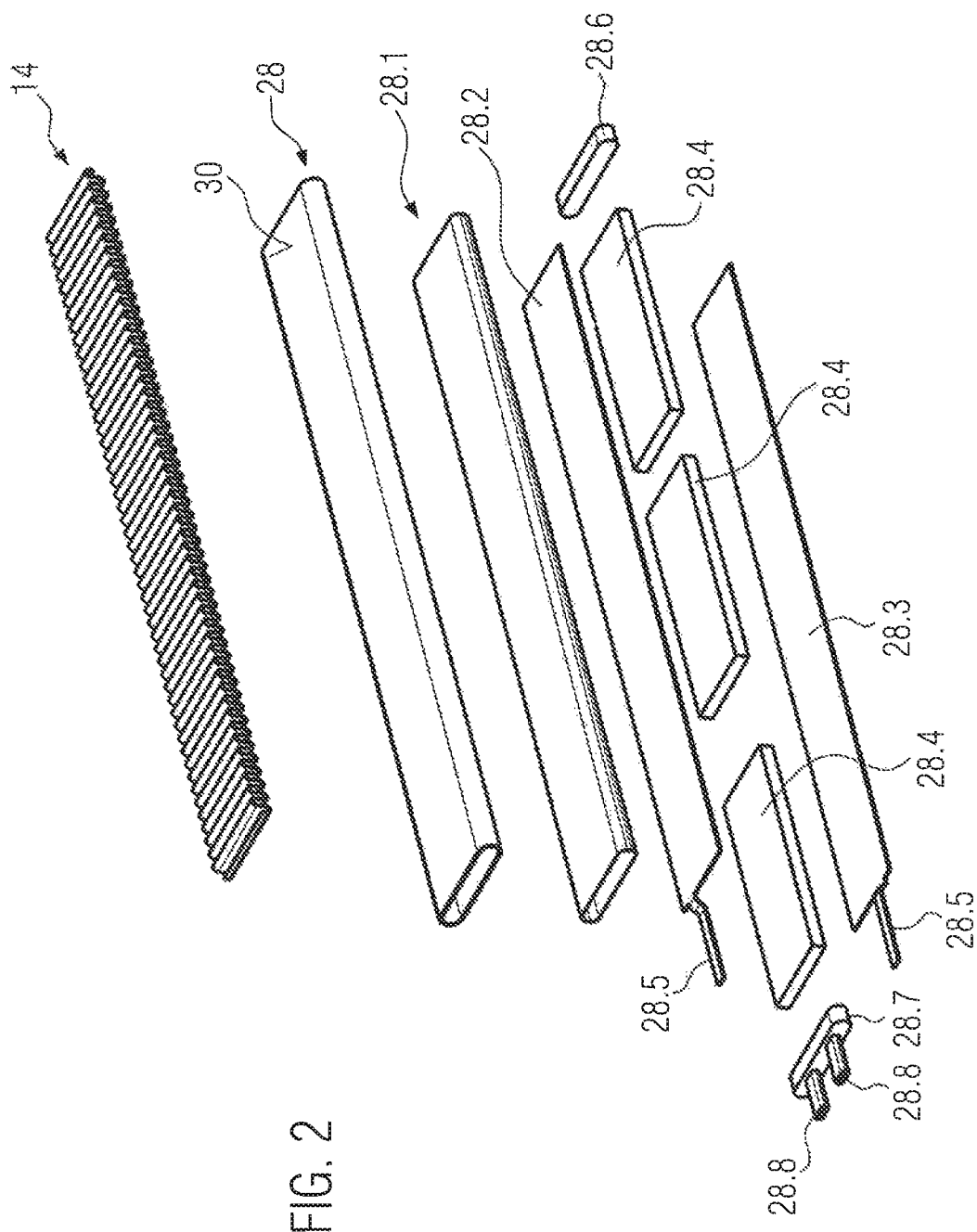
FIG. 2 shows a perspective side view of a heat-generating element of the embodiment in an exploded illustration.
Figure 3:
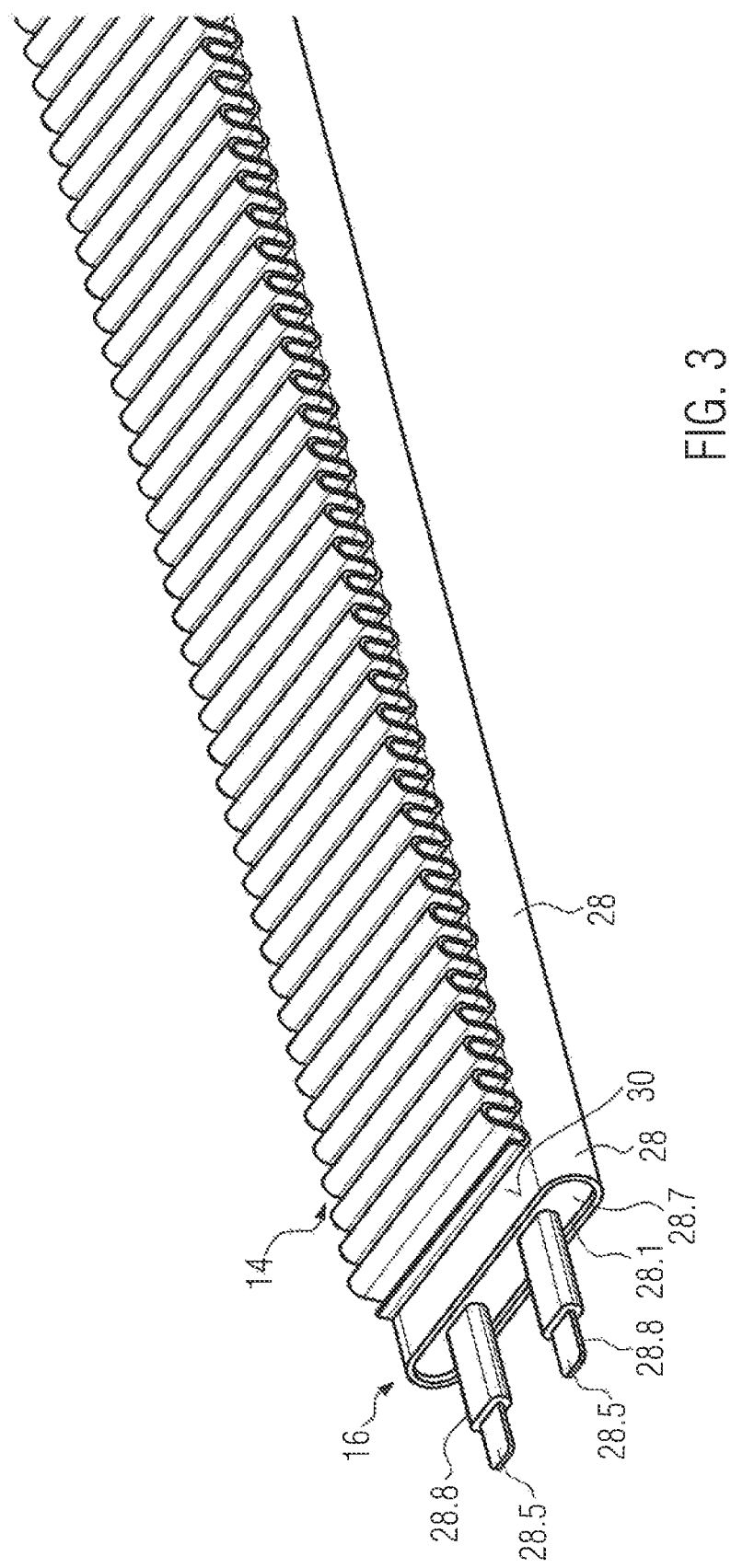
FIG. 3 shows a perspective side view of a heat-generating element and a heat-emitting element of the embodiment abutting against the former.

The components of this heat-generating element 16 are illustrated in FIG. 2. Each of the heat-generating elements 16 comprises a flat tube 28 which is lined with a sleeve-shaped, i.e. cylindrical insulation 28.1 on the inner side in the form of an insulating film, such as, for example, polyimide or Kapton. Received within the insulation 28.1 are conductor elements in the form of contact plates 28.2, 28.3 which receive PTC elements 28.4 therebetween and abut directly thereagainst in an electrically conductive manner. The insulation 28.1 can comprise electrically insulating heat-resistant film which can be coated with PTFE on one or both sides. The insulating film can be welded to the inner side of the flat tube 28 under pressure and heat, for example, during operation of the heating device. The PTC elements 28.4 are provided with a metallization which is applied as a coating on the PTC elements 28.4.

Each contact plate 28.2, 28.3 has a contact strip 28.5 formed integrally thereon by punching and bending. On one side, the flat tube 28 is closed by an end plug 28.6 made of plastic material which is sealingly glued into the flat tube 28 or the insulation 28.1, respectively. An end cap 28.7 is provided on the opposite side in the same manner and made from plastic material and integrally forms guide sleeves 28.8 thereon for the respective contact strips 28.5. As can be seen, the contact strips 28.5 are bent over at their ends and are located approximately at an intermediate height of the PCT elements 28.4.

The present invention is not restricted to the embodiment shown specifically in FIG. 2 and presently described. Insulating layers can also be provided as an insulation against main side surfaces 30 of the flat tube 28, for example, ceramic plates, plastic film material or ceramic plates coated with plastic film material. The insulation is an electrical insulation which should preferably have a good thermal conductivity of at least 20 W/(m K). The individual layers of the layer structure, consisting of the insulation 28.1, the contact plates 28.2, 28.3, and the PTC elements 28.4, are commonly loosely inserted into the flat tube 28. These elements are initially fixed axially within the flat tube 28 by way of the end cap 28.7 or the end plug 28.6. The heat-generating element can also be designed substantially as taught in EP 2 428 746 A1.

These elements within the flat tube 28 can be received loosely in the flat tube 28. The flat tube 28 can be provided with a sealing plug at the face side, for example, made of a sealing compound filled into the flat tube 28.

In the embodiment shown, one of the closure caps 22 can provide for the electrical connection of the heat-generating elements 16. In the embodiment shown, the connection strips 28.5 reach beyond all the flat tubes 28 on the same side. These connection strips 28.5 pass through one of the closure caps 24 and are exposed on the side of the closure cap opposite to the layering 12 in order to electrically connect the layering 12 (see FIGS. 7 and 8).

In the embodiment, the casing block 2 forms a partition wall 34 which separates a circulation chamber 36 for the liquid medium to be heated, in the present case water, from a control chamber 38 in which a printed circuit board is accommodated, designated with reference numeral 40. The printed circuit board 40 is equipped with and carries, inter alia, a power switch in the form power transistors 41 creating power dissipation, which, with interposition of an insulating layer 43, are in thermally conductive abutment against the partition wall 34. The partition wall separates the casing block 2 on the inlet side, i.e. in part defines the inlet passage 6. The partition wall 34 is accordingly located on the cold side, thereby ensuring a maximum temperature gradient between the circuit board 40 and the fluid within the circulation chamber 36 and thereby efficient cooling of the power switch 41 creating the power dissipation.

FIG. 1 shows a closure cap 22 with the two connection ports 26, as well as electrical power cables 42 for the power current, which are electrically connected to the conductor elements of the printed circuit board 40 and/or the power transistor 41 creating the power dissipation. The cables 42 are presently led directly into the control chamber 38 within the casing block 2. However, the closure cap 22 can just as well comprise a connector for connecting the power cables 42. Reference numeral 44 denotes a connector casing for control cables which are electrically connected to the control unit that is realized on the printed circuit board 40.

As can be seen in FIG. 1, the layering 12 is held pretensioned within the casing block 2 by way of a spring element 46, namely between the oppositely disposed abutment surfaces 10 extending in parallel to one another. The spring element can there be designed as described in EP 2 298 582 A1, which is incorporated by reference into the content of this application. This provides the option of arranging the layering 12 together with the spring element 46 between the two abutment surfaces 10 in a substantially tension-free manner, and then applying the spring tension by sliding the sheet metal strips of the spring element 46. The layering 12 together with the spring element 46 can therefore be inserted into the casing block 2 free of tension.

Figure 4:
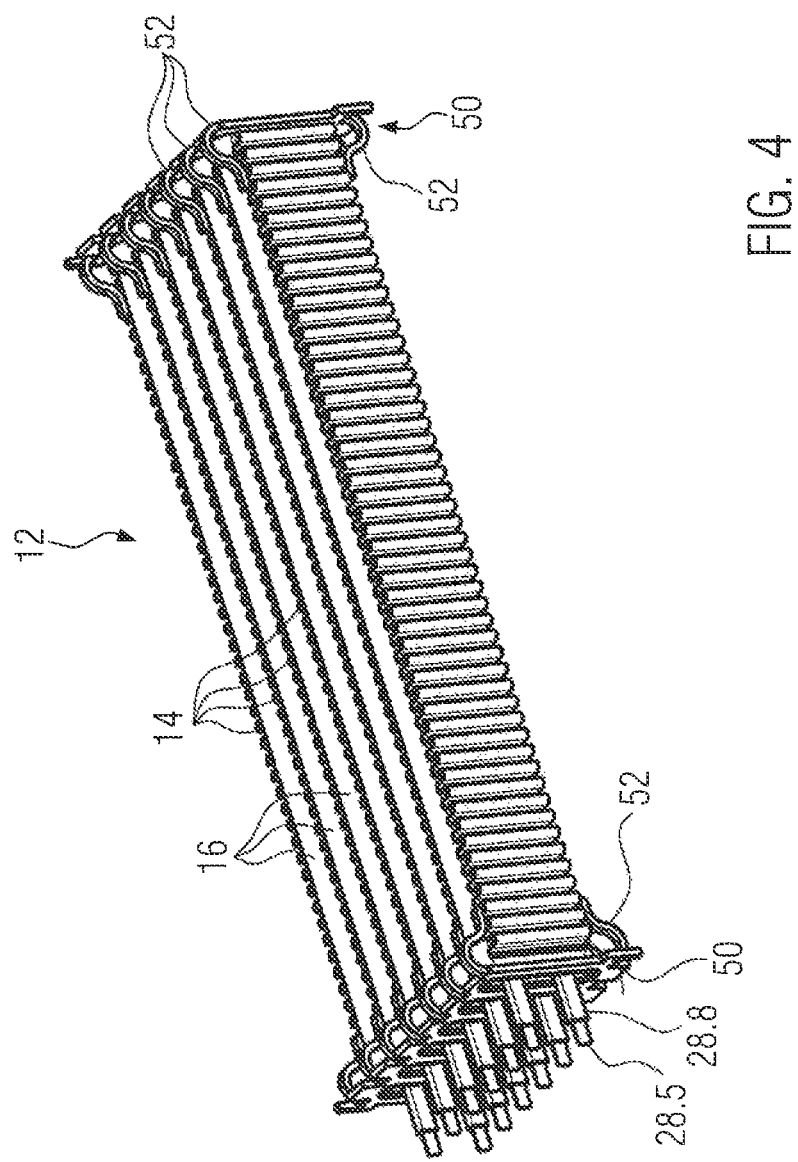
FIG. 4 shows a perspective side view of the layering of the embodiment with mounting aids.
Figure 5:
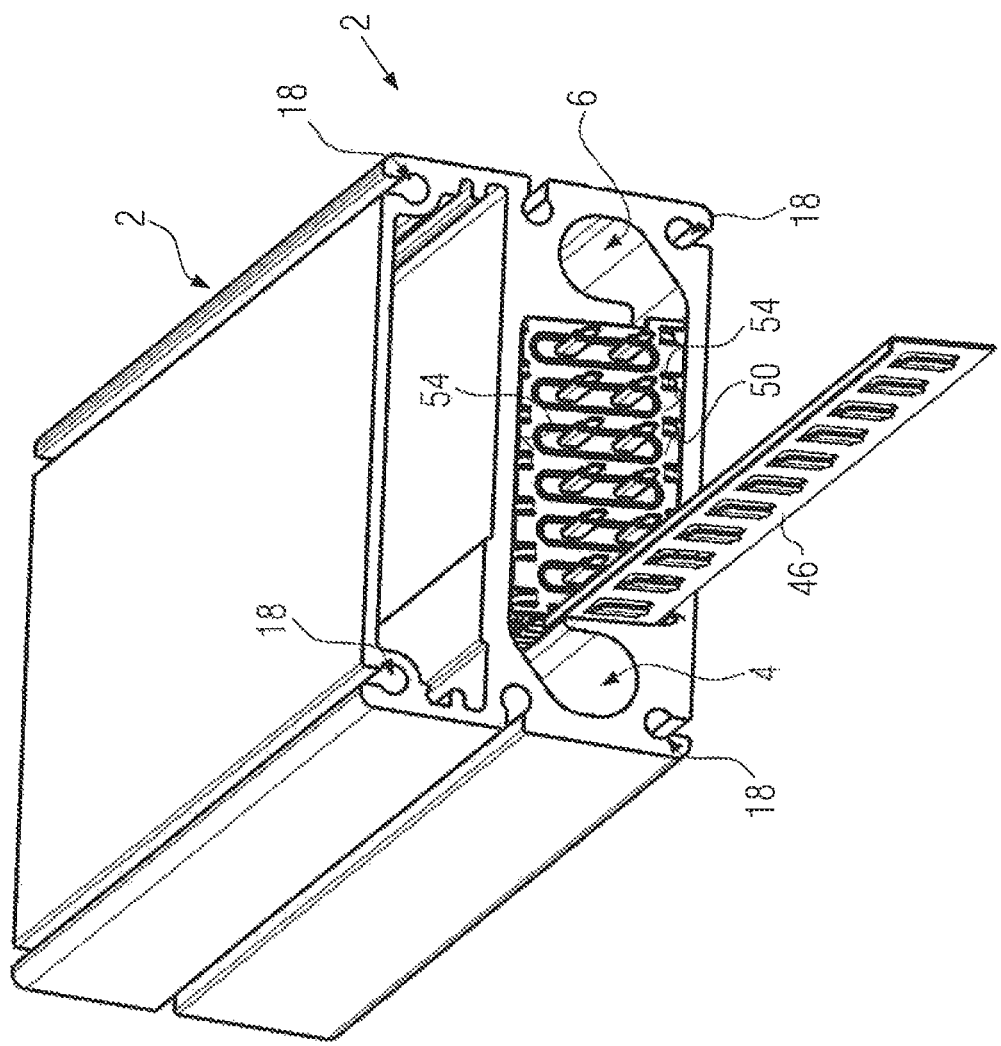
FIG. 5 shows a perspective face side view of the embodiment after installation of the layering shown in FIG. 4 when inserting a spring element.
Figure 6:
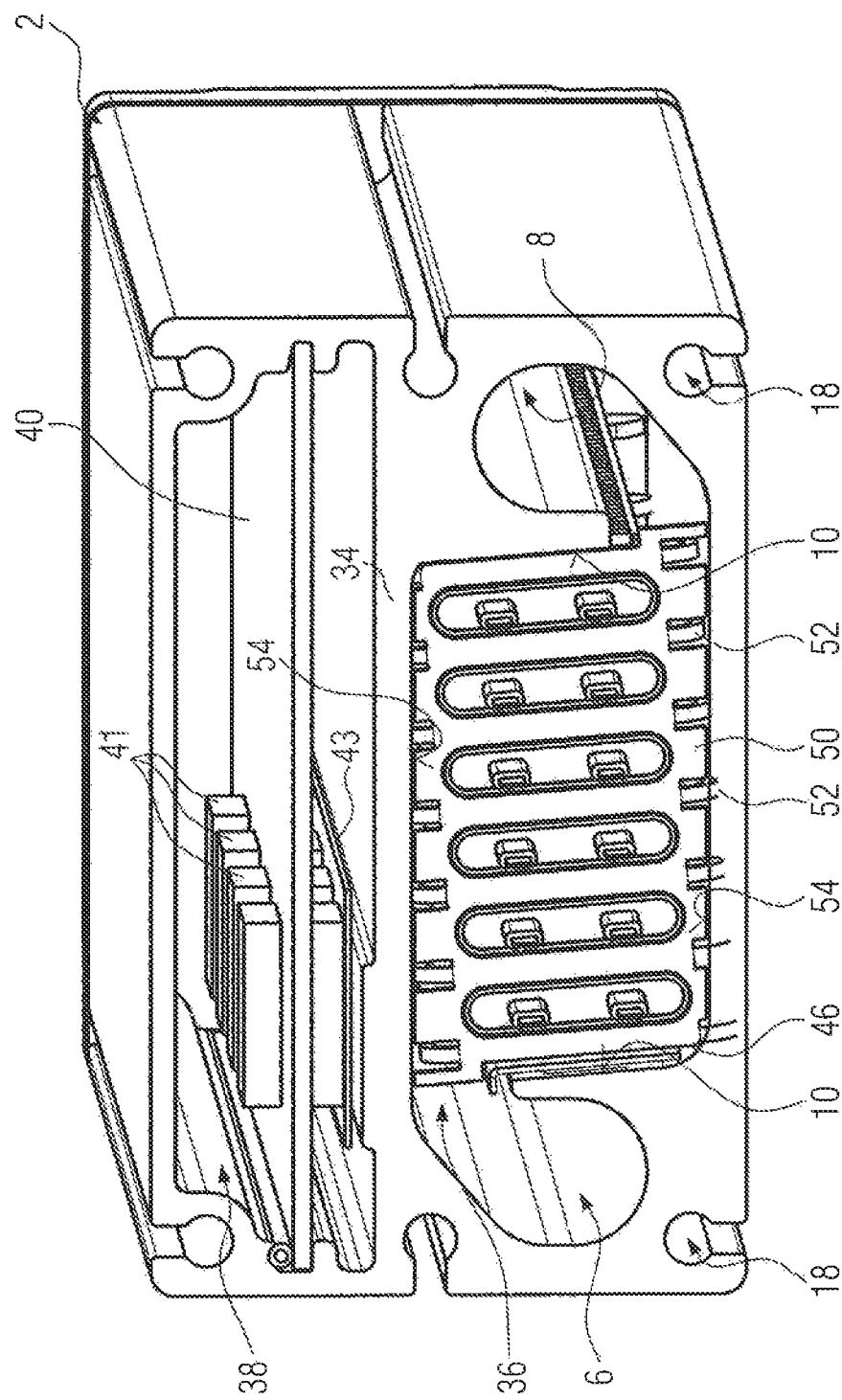
FIG. 6 shows a view similar to FIG. 5 after the insertion of the spring element and a printed circuit board.

When mounting the layering 12 within the casing block 2, a mounting aid 50 is preferably used, as shown in FIGS. 4 to 6. The mounting aid 50 is formed from a stamped piece of sheet metal. FIG. 4 illustrates two mounting aids 50 on the respective face sides of the layering 12. In view of universal applicability, the mounting aids 50 are preferably identical on both face sides of the layering 12. The mounting aid 50 comprises bores which are designed to receive the flat tubes 28 at the end side (cf. FIG. 6). Provided between these recesses are spring arms 52 which abut against the oppositely disposed surfaces of the heat-emitting corrugated rib layers 14, as shown in FIG. 4. As a result, the layering 12 with its initially loosely arranged or juxtaposed heat-emitting and heat-generating elements 14, 16 is combined to form a mounting unit. In this way, the preassembled unit shown in FIG. 4 can be inserted into the casing block 2. The spring arms 52 there abut against oppositely disposed abutment surfaces which are formed by the casing block 2 and extend parallel to one another. These parallel surfaces are denoted with reference numeral 54 in FIG. 6 and, on the outer side, define the respective flow cross-section 29 to the inlet and outlet passages 6, 8, respectively. The mounting aid 50 can remain in the casing block 2 after assembly in order to hold the layering therein, even if the spring tension is usually sufficient for tensioning and holding the layering between the abutment surfaces 10.

In this way, the spring element 46 is now pushed into the casing block 2 on one side (see FIG. 5) or even on both sides in order to clamp and tension the layering 12 between the oppositely disposed abutment surfaces 10. Electrical insulation can there be provided on the inner side of the abutment surface 10 as additional electrical protection of the casing block 2 from the current-conducting elements in the event that the insulation 28.1 within the flat tube 28 fails.

Figure 7:
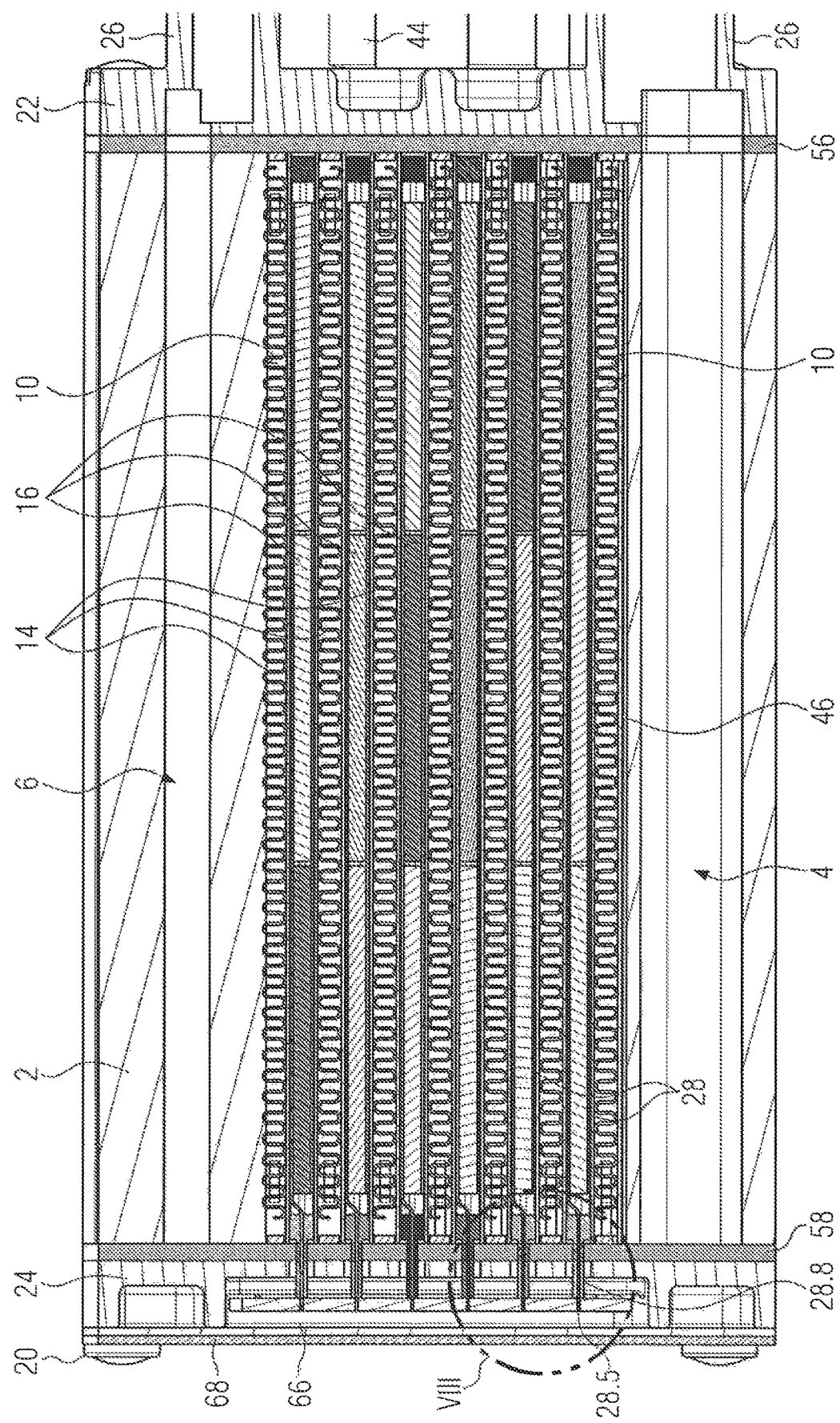
FIG. 7 shows a longitudinal sectional view of the embodiment.
Figure 9:
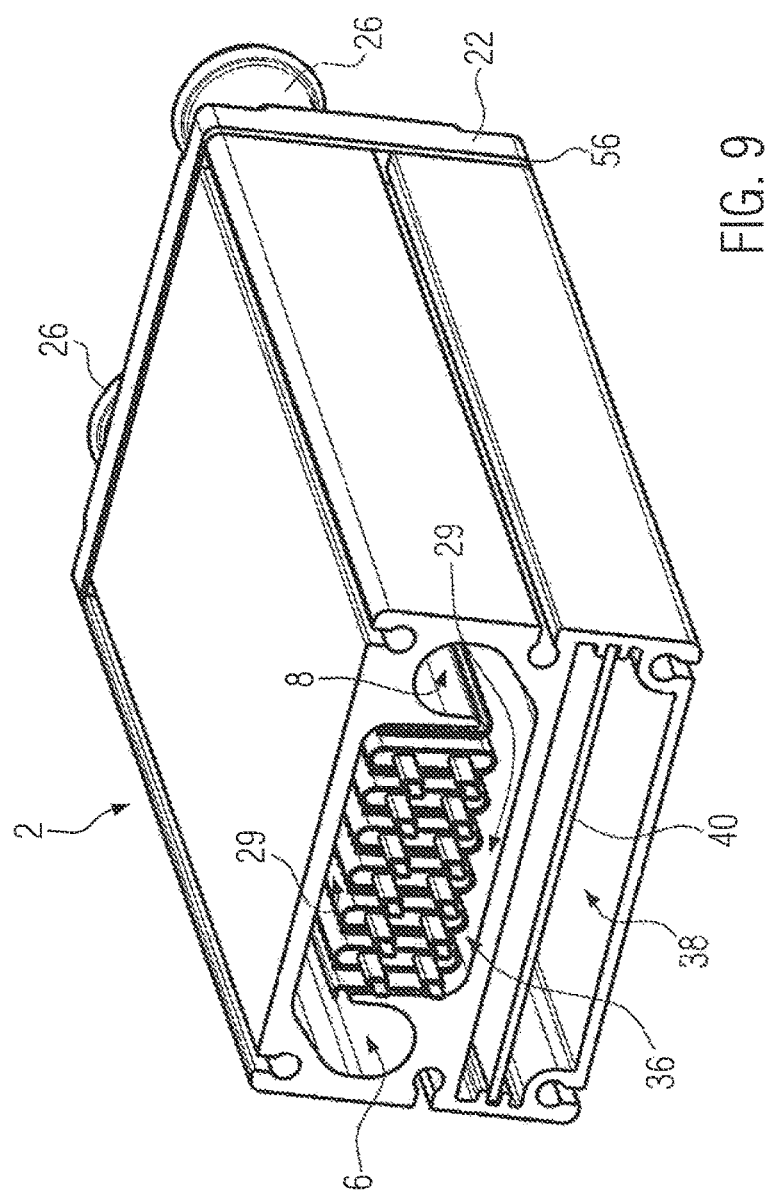
FIG. 9 shows a perspective face side view of the embodiment after installation of the layering shown in FIG. 4 and with the cover element removed at one end.
Figure 8:
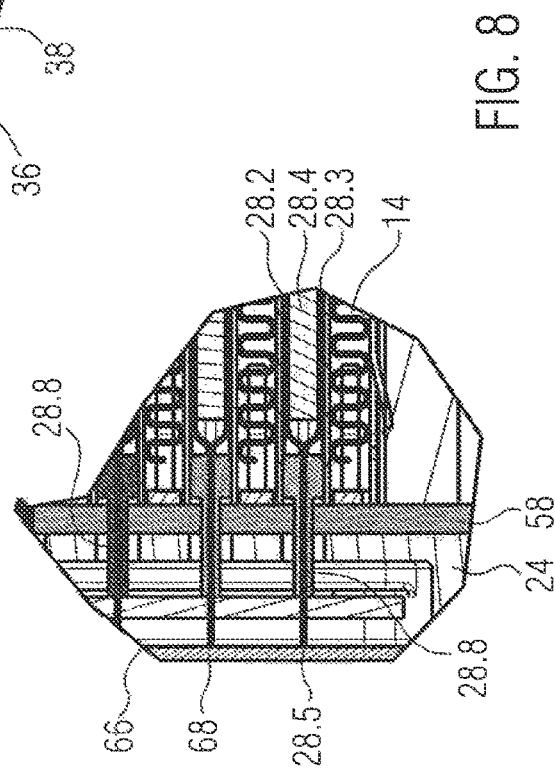
FIG. 8 shows an enlarged view of detail VII according to the representation in FIG. 7

As illustrated by FIGS. 1 and 7 or 8, respectively, a sealing plate 56 is provided as a flat seal between the closure cap 22 and the casing block 2 and bears against a face side of the casing block 2 in a substantially planar manner, and comprises bores corresponding to the position of the inlet and outlet passages 6, 8 as well as to the position of the through bores 18.

A similar sealing plate 58 is provided on the opposite side between the closure cap 24 and the casing block 2. This sealing plate 58 has a large passage opening 60 which is substantially flush with the control chamber 38. Furthermore, the sealing plate 58 has a plurality of bores 62 which are adapted for the passage of the guide sleeves 28.8, but otherwise the sealing plate 58 is in sealing abutment against the face end of the flat tubes 28. The flat tubes are also received at the end side within the circulation chamber 36 and are received in a sealing manner within this circulation chamber 36.

A connecting printed circuit board 64 is disposed on the side of the closure cap 24 that is opposite to the sealing plate 58 and is in electrical contact with all contact strips 28.5 and can group them it in order to assign several heat-generating elements 16 to one common heating circuit. The respective conductor elements to the individual heat-generating elements 16 are electrically connected via a board-to-board plug connection to conductor elements of the control circuit board 40. The connecting printed circuit board 64 is disposed between the closure cap 24 and a sealing plate 66, which is in sealing abutment between the cover 68 and the closure cap 24 due to a pressing force produced by a cover 68, in order to hermetically seal in the connecting printed circuit board 64.

The particular feature of the present invention is in particular that the flat tube is not per se stable or rigid but merely forms an outer enclosure which can receive the individual components of the heat-generating element 16 within itself. The layers of the heat-generating element 16 are pressed against each other only due to an external force. With the pretension of the spring element 46, a good electrical abutment arises between the two contact surfaces 28.2 and 28.3 against the main side surface of the PTC element 28.4. Furthermore, due to the effect of the contact surface 28.2, 28.3 and the insulation 28.1, the PTC element 28.4 is abutted in a good heat-conducting manner against the inner circumferential surface of the flat tube 28 which emits the heat generated within the flat tube 28 toward the exterior and toward the heat-emitting elements 14. Flat tubes made of thin aluminum sheet can be used as flat tubes 28. In addition to the pressing force caused by the spring element 46, the fluid pressure can also compress the interior of the respective flat tube 28.

The corrugated rib elements provided as heat-emitting elements 14 are preferably configured such that they generate a turbulent flow. For this purpose, the surface of the corrugated rib elements can be roughened, for example, by way of shot blasting, plasma blasting, or sand blasting. The casing block 2 leads to a structural unit comprising the control chamber 38 and the circulation chamber 36, where the heat-emitting power transistors 41 are assigned to the cold side, i.e. the inlet passage 6, and are accordingly cooled efficiently.

The invention claimed is:

1. An electrical heating device comprising:
   a fluid-tight casing having inlet and outlet openings for fluid to be heated;
   a flat tube arranged in said casing;
   at least one heat-generating element received in said flat tube; and
   heat-emitting elements that abut against opposite sides of said flat tube,
      wherein said heat-emitting elements abut against said flat tube subject to spring pretension of at least one spring arranged outside of the flat tube, and
      wherein said electrical heating device further comprises a layering which is composed of heat-generating and heat-emitting elements and which abuts between casing walls which, on an inner side thereof, define an inlet passage and an outlet passage, respectively, which both extend in a longitudinal direction of said flat tube.

2. An electrical heating device according to claim 1, wherein said heat-generating element comprises at least one PTC element and conductor elements contacting to different polarities, the conductor elements abutting against said flat tube subject to spring pretension.

3. An electrical heating device according to claim 2, wherein said conductor elements are received in said flat tube and, with the interposition of an electrical insulation, abut against an inner circumferential surface of said flat tube.

4. An electrical heating device according to claim 1, wherein each of said inlet and outlet passages, respectively, is open over an entire length of said flat tube toward said layering.

5. An electrical heating device according to claim 2, wherein said casing comprises a casing block forming an abutment surface for a layering composed of heat-emitting and heat-generating elements, a length of said casing block corresponding to a length of said flat tube, wherein said casing block is open on opposed sides thereof in a longitudinal direction of said flat tube, and wherein said casing is closed by closure caps sealingly abutting against said casing block.

6. An electrical heating device according to claim 5, wherein at least one of said closure caps comprises a connection port surrounding said inlet and outlet openings, respectively.

7. An electrical heating device according to claim 5, wherein said flat tube abuts in a sealed manner against one of said closure caps, and wherein at least one connection strip is electrically coupled to one of said conductor elements and is passed in an electrically insulated manner through said one closure cap.

8. An electrical heating device according to claim 5, wherein said layering is clamped between abutment surfaces formed by an integrally designed casing block.

9. An electrical heating device according to claim 5, wherein said layering is installed in an inclined manner, so that a flow cross-section between said layering and said casing decreases as a distance from said inlet or outlet passage increases.

10. An electrical heating device according to claim 1, further comprising a partition wall provided in said casing, wherein the partition wall defines said inlet passage at least in part and separates a circulation chamber for the fluid to be heated from a control chamber for accommodating a control device, wherein the control device comprises at least one power switch creating power dissipation, the power switch being coupled in a heat-conductive manner to said partition wall.

11. An electrical heating device according to claim 5, wherein one of said closure caps comprises connection ports to said inlet and outlet openings, and wherein the other of said closure caps is provided with a printed circuit board, conductor elements of which are electrically connected to conductor elements of several heat-generating elements.

12. An electrical heating device according to claim 10, wherein said casing comprises a casing block which extends parallel to said heat-emitting and heat-generating elements, wherein said casing block has a sliding guide into which a printed circuit board can be inserted and in which said printed circuit board is held under pretension against a partition wall formed by said casing block.

13. An electrical heating device according to claim 1, wherein said flat tube is sealed with a plug, at least at opposed face sides thereof.

14. An electrical heating device according to claim 1, wherein said flat tube is, within said casing, sealed against a cover of said casing.

15. An electrical heating device comprising:
    a fluid-tight casing having inlet and outlet openings for a fluid to be heated;
    a flat tube arranged in the casing;
    at least one heat-generating element received in said flat tube; and
    heat-emitting elements abutting against opposite sides of said flat tube,
       wherein said casing comprises a casing block, forming casing walls having an abutment surface for a layering, the layering being composed of heat-emitting and heat-generating elements, a length of said casing block corresponding to a length of said flat tube, wherein the casing block is open on opposed sides in a longitudinal direction of said flat tube and is closed by closure caps sealingly abutting against said casing block,
       wherein said casing walls define an inlet passage and an outlet passage,
       respectively, which both extend in the longitudinal direction of said flat tube,
       and wherein said layering is installed in an inclined manner, so that a flow cross-section between said layering and said casing decreases as a distance from said inlet or outlet passage increases.

16. An electrical heating device according to claim 15, wherein said heat-generating element comprises at least one PTC element and conductor elements contacting to different polarities, the conductor elements abutting against said flat tube subject to spring pretension of at least one spring arranged outside of the flat tube.

17. An electrical heating device comprising:
a fluid-tight casing having inlet and outlet openings for fluid to be heated;
a flat tube arranged in said casing;
at least one heat-generating element received in said flat tube; and heat-emitting elements that abut against opposite sides of said flat tube,
wherein said heat-emitting elements abut against said flat tube subject to spring pretension of at least one spring arranged outside of the flat tube, wherein said electrical heating device further comprises a partition wall provided in said casing,
wherein the partition wall defines said inlet passage at least in part and separates a circulation chamber for the fluid to be heated from a control chamber for accommodating a control device, wherein the control device comprises at least one power switch creating power dissipation, the power switch being coupled in a heat-conductive manner to said partition wall.

* * * * *